(12) United States Patent
Möller

(10) Patent No.: US 12,139,210 B2
(45) Date of Patent: Nov. 12, 2024

(54) BEARING ASSEMBLY

(71) Applicants: thyssenkrupp Presta AG, Eschen (LI); thyssenkrupp AG, Essen (DE)

(72) Inventor: Dirk Möller, Sennwald (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 187 days.

(21) Appl. No.: 17/439,717

(22) PCT Filed: Feb. 10, 2021

(86) PCT No.: PCT/EP2021/053117
§ 371 (c)(1),
(2) Date: Sep. 15, 2021

(87) PCT Pub. No.: WO2021/160626
PCT Pub. Date: Aug. 19, 2021

(65) Prior Publication Data
US 2022/0371652 A1    Nov. 24, 2022

(30) Foreign Application Priority Data
Feb. 12, 2020  (DE) .................... 10 2020 201 761.1

(51) Int. Cl.
*B62D 5/04* (2006.01)
*F16H 55/24* (2006.01)
*F16H 57/021* (2012.01)

(52) U.S. Cl.
CPC ......... *B62D 5/0454* (2013.01); *B62D 5/0409* (2013.01); *F16H 55/24* (2013.01); *F16H 57/021* (2013.01); *F16H 2057/0213* (2013.01)

(58) Field of Classification Search
CPC ..... B62D 5/0454; B62D 5/0409; F16H 55/24; F16H 57/021; F16H 2057/0213
See application file for complete search history.

(56) References Cited

U.S. PATENT DOCUMENTS

2014/0020973 A1\*  1/2014  Galehr ................. B62D 5/0409
                                                                 180/444
2015/0040699 A1\*  2/2015  Hafermalz ........... B62D 5/0409
                                                                 74/89.16
(Continued)

FOREIGN PATENT DOCUMENTS

CN        109153407 A     1/2019
CN        109963769 A     7/2019
(Continued)

OTHER PUBLICATIONS

English Translation of International Search Report Issued in PCT/EP2021/053117 dated May 5, 2021.

*Primary Examiner* — Kevin Hurley
*Assistant Examiner* — Michael R Stabley
(74) *Attorney, Agent, or Firm* — thyssenkrupp North America, LLC

(57) ABSTRACT

A bearing arrangement may be used to mount a worm shaft meshing with a worm wheel in a housing of an electromechanical power steering system. The bearing arrangement comprises a first rotary bearing, a second rotary bearing, and a pivoting ring. The first rotary bearing is configured to permit a pivoting movement of the worm shaft. The pivoting ring comprises a first pivoting ring component and a second pivoting ring component and is configured to act resiliently between the second rotary bearing and the housing. The second rotary bearing is at least partially arranged between the first pivoting ring component and the second pivoting ring component. The first pivoting ring component has two first points, with respect to which the first pivoting ring component is configured resiliently. The second pivoting ring component has two second points, with respect to which the second pivoting ring component is configured resiliently.

22 Claims, 8 Drawing Sheets

(56) References Cited

U.S. PATENT DOCUMENTS

| | | |
|---|---|---|
| 2016/0121921 A1 | 5/2016 | Schonlechner et al. |
| 2018/0003292 A1 | 1/2018 | Figura et al. |
| 2018/0058556 A1 | 3/2018 | Appleyard |
| 2018/0073627 A1* | 3/2018 | Gibbs .................. F16H 57/039 |
| 2019/0225258 A1 | 7/2019 | Vonier et al. |
| 2019/0270476 A1 | 9/2019 | Hafermalz et al. |
| 2019/0308658 A1 | 10/2019 | Brassel et al. |
| 2020/0055540 A1 | 2/2020 | Hafermalz et al. |
| 2020/0063796 A1 | 2/2020 | Hafermalz et al. |
| 2021/0371005 A1 | 12/2021 | Rath |

FOREIGN PATENT DOCUMENTS

| | | |
|---|---|---|
| CN | 110143172 A | 8/2019 |
| DE | 84 18 450 U1 | 11/1984 |
| DE | 102008001878 A1 | 11/2009 |
| DE | 10 2008 040 673 A1 | 1/2010 |
| DE | 10 2009 054 655 A1 | 6/2011 |
| DE | 10 2012 103 147 A1 | 10/2013 |
| DE | 10 2013 007 883 A1 | 11/2014 |
| DE | 10 2014 218 303 A1 | 3/2016 |
| DE | 20 2016 103 794 U1 | 7/2016 |
| DE | 10 2016 211 714 B3 | 9/2017 |
| DE | 10 2016 211 694 B3 | 10/2017 |
| DE | 10 2016 121 394 A1 | 5/2018 |
| DE | 10 2016 121 412 A1 | 5/2018 |
| DE | 10 2017 207 708 A1 | 11/2018 |
| DE | 102018106025 A1 | 9/2019 |
| JP | S55159346 A | 12/1980 |
| WO | 2017/153083 A1 | 9/2017 |
| WO | 2019/002888 A1 | 1/2019 |
| WO | 2019/174963 A1 | 9/2019 |

\* cited by examiner

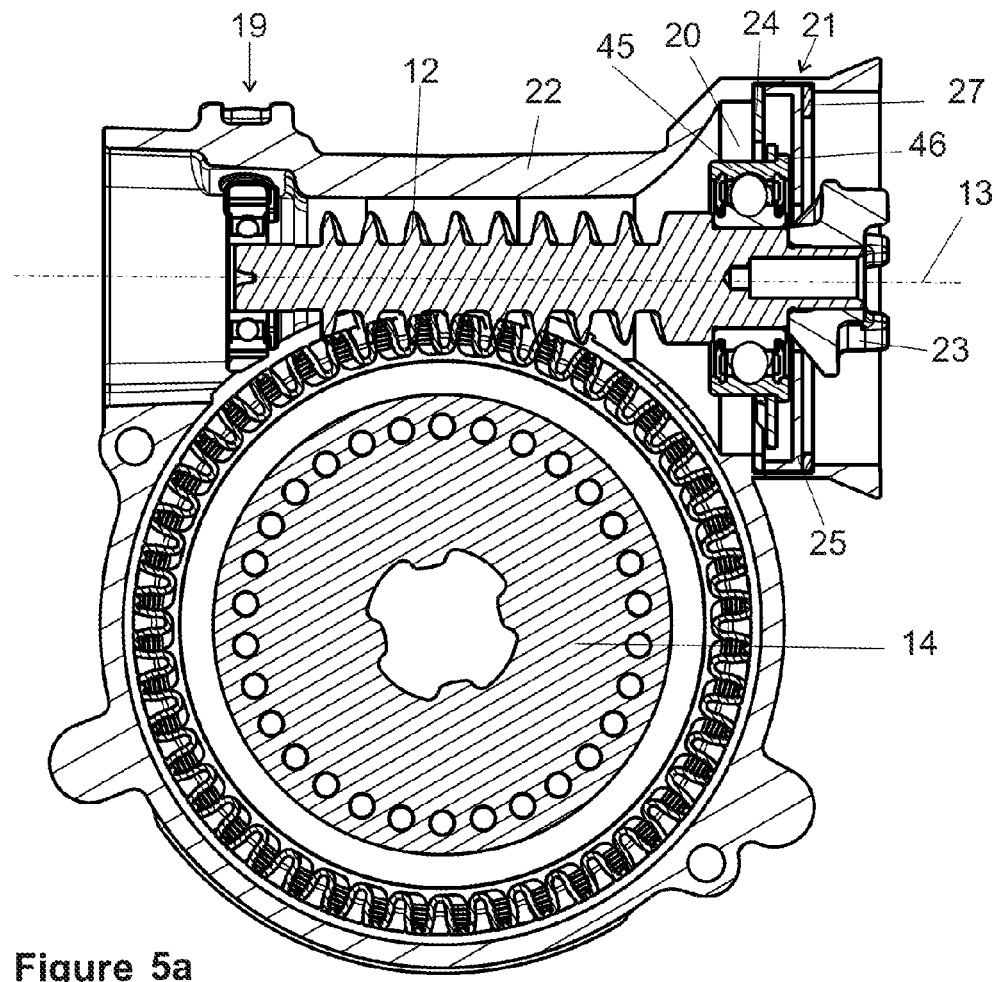
Figure 5a
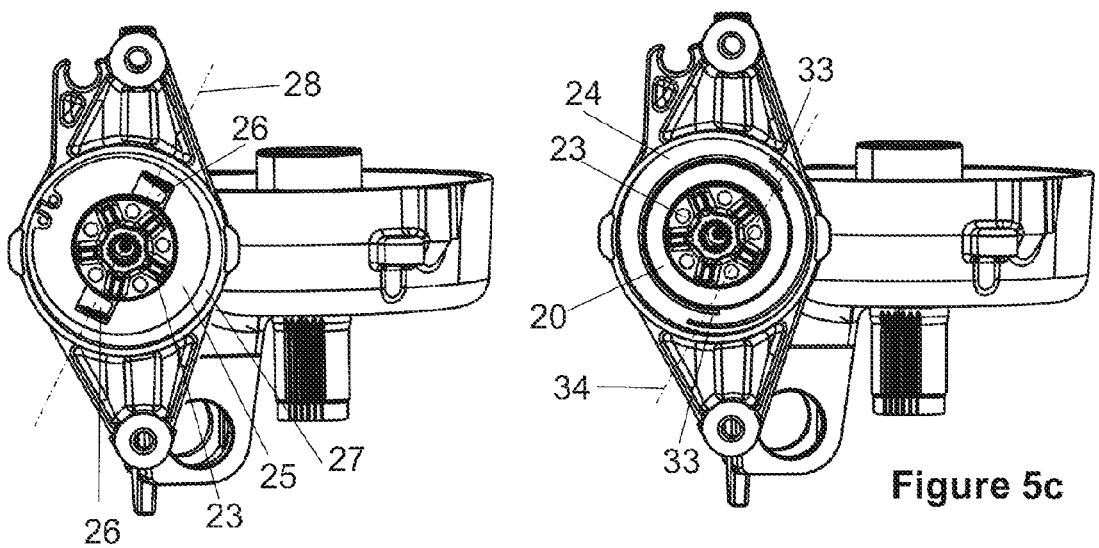
Figure 5b
Figure 5c

BEARING ASSEMBLY

CROSS REFERENCE TO RELATED APPLICATIONS

This application is a U.S. National Stage Entry of International Patent Application Serial Number PCT/EP2021/053117, filed Feb. 10, 2021, which claims priority to German Patent Application No. DE 10 2020 201 761.1, filed Feb. 12, 2020, the entire contents of both of which are incorporated herein by reference.

FIELD

The present disclosure generally relates to steering systems, including bearing arrangements for mounting worm shafts that mesh with worm wheels in housings of electromechanical power steering systems.

BACKGROUND

In electromechanical power steering systems, an electric motor generates a torque which is transmitted to a transmission and is superimposed there on the steering torque provided by the driver.

Bearing arrangements of this type are already known from the prior art, for example from DE 10 2012 103 147 A1. They are used, for example, in power-assisted steering systems, wherein they have a power-assisted steering motor which drives a worm shaft which meshes with a worm wheel arranged on a steering shaft, wherein the worm wheel is operatively connected to an input shaft of a steering gear, and wherein the worm shaft and the steering shaft are mounted rotatably in a common housing. Due to the geometry of the teeth of worm shaft and worm wheel, the worm shaft is pushed away from the worm wheel in the event of a load. This leads to undesirable gearing play between the worm shaft and the worm wheel. Additional gearing play between the worm shaft and the worm wheel is caused, for example, by dimensional tolerances or wear of the structural elements. Gearing play causes undesirable noises during the operation of the worm wheel gear. In particular, these undesirable noises occur during steering with directly successive, alternating steer angle directions, also referred to as alternating steering.

A bearing arrangement of a steering gear is also known, for example, from DE 10 2017 207 708 A1. The bearing arrangement comprises a pivoting ring, via the torsion webs of which the position of a pivot axis can be defined by an outer ring of the pivoting ring being configured to be pivotable in relation to the inner ring of the pivoting ring. The torsion webs have a radial offset with respect to the center of the pivoting ring, and therefore the pivot axis is shifted into the meshing radius. As a result, the formation of reaction torques which arise from the toothing forces in the toothing region between worm shaft and worm wheel can be reduced.

However, this solution has proven disadvantageous in that the reaction torque in the pivot bearing is directionally dependent. It increases or weakens the lifting of the worm depending on the operating load and radial force acting on the worm. Undesirable rattling noises thereby arise. Such rattling noises are also referred to as rattle noise.

DE 10 2009 054 655 A1 furthermore describes a steering gear with a screw pinion which can be connected to a drive via a shaft. The steering gear comprises a shaft mounting with a first rotary bearing and a second rotary bearing. Owing to cutouts which are provided, a holder for the first rotary bearing permits a pivoting movement for an annular portion of the holder, which has a noise-reducing effect on the shaft mounting. The positive effect of said holder is weakened depending on the load in action. DE 10 2008 040 673 A1 discloses a similar shaft mounting to DE 10 2009 054 655 A1.

Thus a need exists for an improved electromechanical power steering system and an improved bearing arrangement for mounting a worm shaft meshing with a worm wheel in a housing of an electromechanical power steering system, wherein the bearing arrangement is intended to permit a consistently reliable, quiet operation, in particular even during changing loads, and is advantageously constructed simply.

BRIEF DESCRIPTION OF THE FIGURES

FIG. 4b is a side view of the example bearing arrangement of FIG. 4a.

FIG. 4c is another side view of the example bearing arrangement of FIG. 4a.

FIG. 4d is an exploded perspective view of the example bearing arrangement of FIG. 4a.

FIG. 5a is a partial sectional view of another example bearing arrangement.

FIG. 5b is a side view of the example bearing arrangement of FIG. 5a.

FIG. 5c is another side view of the example bearing arrangement of FIG. 5a.

FIG. 5d is an exploded perspective view of the example bearing arrangement of FIG. 5a.

FIG. 6b is a partial sectional view of the example bearing arrangement of FIG. 6a.

FIG. 6c is a side view of the example bearing arrangement of FIG. 6a.

FIG. 6e is an exploded view of the example bearing arrangement of FIG. 6a.

DETAILED DESCRIPTION

Figure 1:
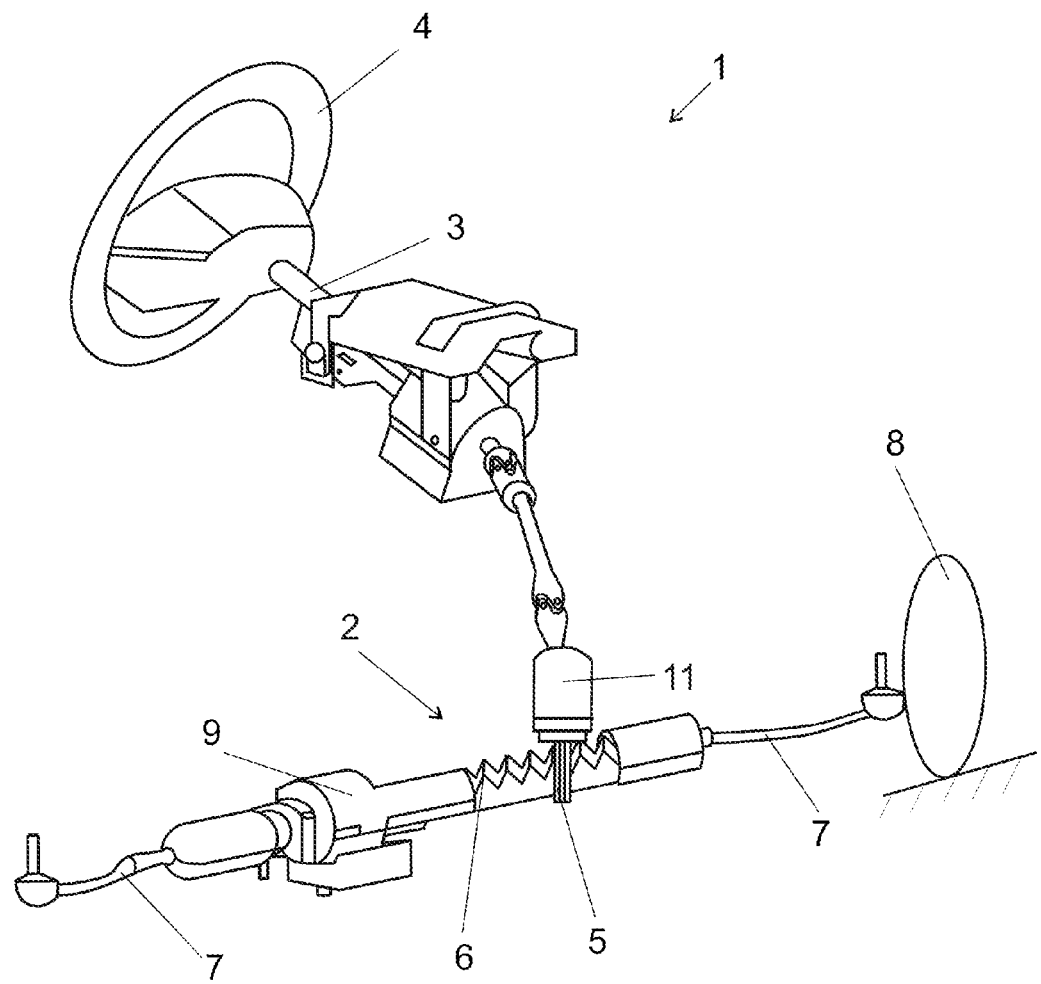
FIG. 1 is a schematic perspective view of an example electromechanical power steering system.

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to bearing arrangements for mounting worm shafts meshing with worm wheels in housings of electromechanical power steering systems. In some examples, a bearing arrangement may comprise a first rotary bearing, a second rotary bearing and a pivoting ring, wherein the first rotary bearing is configured so as to permit a pivoting movement of the worm shaft, wherein the second rotary bearing is arranged in the pivoting ring. Furthermore, the invention relates to an electromechanical power steering system with a drive module that comprises a drive motor, a housing and a worm gear. A worm shaft of the worm gear may be mounted in a bearing arrangement.

In some examples, a bearing arrangement can be used to mount a worm shaft meshing with a worm wheel in a housing of an electromechanical power steering system. The bearing arrangement comprises a first rotary bearing, a second rotary bearing and a pivoting ring, wherein the first rotary bearing is configured so as to permit a pivoting movement of the worm shaft, wherein the second rotary bearing is arranged in the pivoting ring, and wherein the pivoting ring is configured so as to act resiliently between the second rotary bearing and the housing.

In particular, the pivoting ring comprises a first pivoting ring component and a second pivoting ring component. The second rotary bearing is advantageously at least partially arranged between the first pivoting ring component and the second pivoting ring component. Advantageously, the first pivoting ring component has two first points, with respect to which the first pivoting ring component is configured resiliently, and the second pivoting ring component advantageously has two second points, with respect to which the second pivoting ring component is configured resiliently. The points here are not points in the strictly mathematical sense, but rather have in particular a certain flat extent which, however, is configured to be much smaller than the respective pivoting ring component. In particular, the two first points and the two second points are in each case sprung support points.

According to a further advantageous refinement, it is provided that the first two points form a first axis and the second two points form a second axis. That is to say in particular that a straight line is placed through the first two points and a straight line is placed through the second two points. Owing to the fact that the pivoting ring components are configured resiliently with respect to the points, the respective pivoting ring component can pivot in particular with respect to the axis formed by the respective pair of points. Advantageously, the first axis and the second axis are not congruent, that is, the first two points and the second two points are arranged in particular at different locations such that the axes run differently through the points. In particular, it is provided that the axes run offset parallel to one another.

In an advantageous manner, the pivoting ring is configured so as to pretension the worm shaft against the worm wheel. The pretensioning prevents the worm shaft from lifting off the worm wheel, and therefore the worm gear is substantially free from play.

The pivoting ring is preferably configured so as to form a pivot axis for pivoting the worm shaft. The worm shaft can thereby be pushed or pivoted in the direction of the worm wheel. In other words, it is thereby made possible to prevent or to reduce lifting of the worm shaft from the worm wheel. This prevents or reduces the gearing play and thus prevents undesirable rattling noises during the operation of the worm gear. The pivot axis is in particular dependent on the formation of the two first points of the first pivoting ring component and the two second points of the second pivoting ring component. In particular, it is provided that the pivoting ring is configured in such a manner that the pivot axis is formed by the two first points and the two second points.

Furthermore preferably, the pivoting ring is configured in such a manner that the pivot axis for pivoting the worm shaft runs orthogonally or normally to the radial vector of the worm wheel. Such a pivoting movement permits a comparatively simple construction of the bearing arrangement.

Even more preferably, the pivoting ring is configured in such a manner that the pivot axis for pivoting the worm shaft is formed by the sprung support points. The support points have in particular a defined distance to the axis of rotation and lie relative to one another such that no movement or no grinding occurs at the support points.

In an advantageous manner, the pivoting ring via the two first points and the two second points, in particular via the sprung support points, changes or displaces the position or spatial position of the pivot axis depending on the direction of rotation of the worm shaft. In other words, the pivoting ring is configured in such a manner that the position or spatial position of the pivot axis is dependent on the direction of rotation of the worm shaft. The pivot axis can be displaced in parallel, as a result of which the position thereof changes. The direction of rotation of the worm shaft may also be referred to as the load direction.

In a further advantageous manner, the pivoting ring via the two first points and the two second points, in particular via the sprung support points, changes or displaces the position or spatial position of the pivot axis depending on the amount of the load torque that is to be overcome. In other words, the pivoting ring is configured in such a manner that the position or spatial position of the pivot axis is dependent on the amount of the load torque that is to be overcome. The pivot axis can be displaced in parallel, as a result of which its position is changed.

According to a further advantageous refinement of the bearing arrangement, the second rotary bearing has an outer ring, wherein the outer ring forms a shoulder or a step, on which the first pivoting ring component and/or the second pivoting ring component are/is arranged. The step or the shoulder is particularly preferably formed integrally on the outer ring. The design of the pivoting ring can thereby be advantageously simplified. In particular, a pivoting ring which exclusively comprises the first pivoting ring component and the second pivoting ring component, and is therefore in two parts, can be realized.

Advantageously, the shoulder or the step of the outer ring serves as a mechanical stop for the first pivoting ring component and/or the second pivoting ring component. A further stop is advantageously formed by a housing surrounding the bearing arrangement. This advantageously makes it possible to dispense with an additional securing element which secures the first pivoting ring component and the second pivoting ring component in their arrangement position.

In particular, it is provided that the second rotary bearing has an outer ring, wherein the outer ring forms a shoulder, wherein the shoulder is held in a form-fitting manner by the pivoting ring. In particular, it can thereby be realized that the first pivoting ring component is assigned to one side of the second rotary bearing and the second pivoting ring component is assigned to the other side of the second rotary bearing without the pivoting ring components completely surrounding the rotary bearing. A flat design of the pivoting ring can advantageously thereby be realized.

In a further advantageous embodiment of the bearing arrangement, the pivoting ring comprises a slotted ring, in particular a slotted ring as the first pivoting ring component, and a sleeve-shaped element, in particular a sleeve-shaped element as the second pivoting ring component. The sleeve-shaped element has in particular a central recess. The sleeve-shaped element is in particular in the shape of a circular ring and advantageously comprises a raised edge. The raised edge is in particular continuous in the circumferential direction, that is to say with a closed cylinder circumferential surface. In one variant refinement, the raised edge is not continuous in the circumferential direction, that is to say the raised edge has an interrupted cylinder circumferential surface. The slotted ring and the sleeve-shaped element with the central recess advantageously together form the pivot axis for pivoting the worm shaft. Both the slotted ring and the sleeve-shaped element with the central recess advantageously have a spring mounting acting in the axial direction. The spring mounting and the spring elements of the spring mounting are designed here in particular as elastomer elements and/or spring tongues and/or bending bars.

In the case of an elastomer element as the spring element, in particular a wedge-shaped elastomer element is provided which has a load-dependent support point, and which is advantageously designed in such a manner that radial forces can also be transmitted. The two first points and/or the two second points of a pivoting ring component advantageously in each case form the load-dependent support points.

In the case of a bending bar as the spring element, it is likewise in particular provided that such a bending bar has a load-dependent support point. The bending bar of a pivot axis is advantageously connected fixedly to the housing holding the bearing, in order to absorb radial forces. The spring mounting with a bending bar is likewise realized in particular by the two first points and the two second points, wherein said points are in particular the load-dependent support points.

The rotary bearing is preferably connected to the slotted ring and to the sleeve-shaped element. In particular, the rotary bearing can be held, preferably in a manner free from play, between the slotted ring and the sleeve-shaped element. For example, the rotary bearing can be connected by its outer ring to the slotted ring and to the sleeve-shaped element. On the one hand, the outer ring can have a shoulder or a step, wherein the shoulder or the step serves as a mechanical stop for the slotted ring and/or the sleeve-shaped element. The rotary bearing is thereby fixed in the axial direction between the slotted ring and the sleeve-shaped element in a "sandwich construction". On the other hand, the slotted ring and/or the sleeve-shaped element can be configured so as to entirely surround the outer ring of the rotary bearing. An additional fastening means for producing the pivoting ring is thereby rendered superfluous. The construction of the pivoting ring and thus the construction of the bearing arrangement is thus simplified.

Furthermore preferably, a first radially inner slot in the shape of an arc of a circle and a second radially outer slot in the shape of an arc of a circle are formed in the slotted ring, wherein the first slot and the second slot are partially superimposed in the circumferential direction such that a first radially inner circular ring, in particular a partial circular ring, and a second radially outer circular ring, in particular a partial circular ring, arise, wherein the first circular ring and the second circular ring are connected by two webs. The webs are in particular the two first points of the first pivoting ring component. The webs can be configured in particular as a material tapering. The webs serve advantageously for the spring mounting of the slotted ring in the axial direction of the pivoting ring and thereby absorb the radial forces which occur. The webs in particular span partial circles which are formed by the slots. In the load direction, in which the second rotary bearing is pushed against the slotted ring, primarily the two webs of the slotted ring form or define the pivot axis. In such a load situation, the pivot axis substantially corresponds to the axis running through the two webs, and thus in particular to the axis running through the two first points.

Even more preferably, the sleeve-shaped element comprises a disk-shaped portion with a central recess. The sleeve-shaped element advantageously furthermore comprises a wall portion which is connected to the disk-shaped portion at the radially outer edge thereof and extends in the axial direction of the worm shaft. In particular, it is provided that tongues, in particular in the form of the two second points of the second pivoting ring component, are formed in the disk-shaped portion, wherein the tongues each extend in the axial direction of the worm shaft. The tongues advantageously serve for the spring mounting of the sleeve-shaped element in the axial direction of the pivoting ring. In the load direction, in which the second rotary bearing is pushed against the sleeve-shaped element, primarily the two tongues, i.e. in particular the two second points, of the sleeve-shaped element form or define the pivot axis. In such a load situation, the pivot axis substantially corresponds to the axis running through the two tongues, and thus in particular to the axis running through the two second points.

The tongues can be positioned in such a manner that the axis connecting the tongues, i.e. in particular the second axis, is different from an axis passing through the longitudinal axis of the worm shaft. In particular, the tongues are positioned in such a manner that the axis connecting the tongues is not an axis passing through the longitudinal axis of the worm shaft. In particular, the longitudinal axis of the worm shaft and the axis connecting the tongues do not intersect in this refinement and are thus in particular spaced apart from each other. In this refinement, the axis connecting the tongues advantageously does not run through the center point of the sleeve-shaped element. In particular, the longitudinal axis of the worm shaft and the axis connecting the tongues can be orthogonal to each other. In this variant refinement, the axis connecting the webs of the slotted ring, i.e. in particular the first axis, advantageously passes through the longitudinal axis of the worm shaft. The tongues advantageously span a partial circle.

Alternatively, the tongues can be positioned in such a manner that the axis connecting the tongues is an axis passing through the longitudinal axis of the worm shaft. In this exemplary embodiment, the longitudinal axis of the worm shaft and the axis connecting the tongues advantageously intersect. In particular, also in this alternative refinement, the longitudinal axis of the worm shaft and the axis connecting the tongues can be orthogonal to each other. In this alternative refinement, it is provided in particular that the axis connecting the webs of the slotted ring, i.e. in particular the first axis, is not an axis passing through the longitudinal axis of the worm shaft. In particular, the longitudinal axis of the worm shaft and the axis connecting webs of the slotted ring do not intersect in this refinement and are thus in particular spaced apart from each other.

In an advantageous manner, the tongues can be oriented in a manner opposed to one another in the circumferential direction. In other words, the tongues can be arranged lying opposite with respect to an imaginary axis of symmetry running through the center point of the pivoting ring.

In a further embodiment of the bearing arrangement, the pivoting ring comprises a first receiving unit with a central recess and a second receiving unit with a central recess, wherein the first receiving unit and the second receiving unit each comprise an annular element and a spring unit for the spring mounting acting in the axial direction. The first receiving unit here is advantageously the first pivoting ring component and the second receiving unit is advantageously the second pivoting ring component. The two first points of the first pivoting ring component and the two second points of the second pivoting ring component are advantageously formed by the respective spring unit.

Preferably, the second rotary bearing is connected to the first receiving element and to the second receiving element. In particular, the rotary bearing can be held, preferably in a manner free from play, between the first receiving element and the second receiving element. For example, the rotary bearing can be connected by its outer ring to the first receiving element and the second receiving element.

It is furthermore preferred that the pivoting ring comprises a supporting element with a central recess, wherein the supporting element is configured so as to receive the spring unit, in particular the spring unit of one of the receiving units.

The annular element of the first receiving unit can advantageously have moldings running in the tangential direction for receiving the associated spring unit. The moldings are in particular formed integrally with the first receiving unit.

Furthermore, the annular element of the second receiving unit can advantageously have moldings running in the radial direction for receiving the associated spring unit. The moldings are in particular formed integrally with the second receiving unit.

In one particular embodiment, the spring unit can comprise one or more elastomer cushions.

According to a further advantageous refinement, the first pivoting ring component and/or the second pivoting ring component, in particular the sleeve-shaped element and/or the first receiving element and/or the second receiving element and/or the supporting element can have anti-twist protection. The anti-twist protection advantageously ensures that the spatial position of the pivot axis remains invariable. As a result, the pivot axis remains constant, even in particular if vibrations possibly arise, during the operation as intended. Reliable operation is thus ensured.

To achieve the object mentioned at the beginning, an electromechanical power steering system with a drive module which comprises a drive motor, a housing, a worm gear and a bearing arrangement is also proposed. The worm gear here comprises a worm shaft with a worm shaft axis of rotation and a worm wheel with a worm wheel axis of rotation. In particular, it is provided that the worm shaft is driven by the drive motor. The worm shaft is mounted here in the bearing arrangement, wherein the bearing arrangement is configured in accordance with a refinement according to the invention. In particular, the bearing arrangement has the above-described features, in particular the features of the claims, individually or in combination. In particular, it is provided that the electromechanical power steering system is a steer-by-wire steering system.

Further advantageous details, features and refinement details of the invention will be explained in more detail in conjunction with the exemplary embodiments illustrated in the figures.

FIG. 1 shows an electromechanical power steering system in a schematic perspective illustration.

The electromechanical power steering system comprises a steering column 1 and a steering gear 2. The steering column 1 comprises a steering spindle 3, with a steering wheel 4 fastened at the end of the steering spindle facing the driver. The steering wheel 4 may also be referred to as a steering handle. The steering gear 2 comprises a steering pinion 5, a steering rack 6 and two steering tie rods 7. The steering pinion 5 and the steering rack 6 are in engagement with each other. The steering gear 2 serves for converting steering commands which can be produced by rotations of the steering wheel 4 into corresponding rotations of steered vehicle wheels 8.

The steering pinion 5 is mechanically coupled in a known manner by a kinematic connection to the steering rack 6, the respective steering tie rod 7 and the respective steered vehicle wheel 8. The steering command can thus be transmitted from the steering wheel 4 to the respective steered vehicle wheels 8, namely from the steering spindle 3 to the steering gear 2 by mechanical coupling and within the steering gear 2 likewise by mechanical coupling. For the assisted steering, the steering pinion 5 is driven here by the drive module 11.

The electromechanical power steering system can alternatively be configured as a steer-by-wire steering system, not illustrated in the figures, and therefore the steering command is transmitted from the steering wheel 4 to the respective steered vehicle wheels 8, namely from the steering spindle 3 to the steering gear 2 by electric coupling and within the steering gear 2 by mechanical coupling. The electric coupling can be configured in the form of a data transmission device, for example a data cable.

In this exemplary embodiment, a drive module 9 and the drive module 11 are shown in the electromechanical power steering system for the power-assisted steering. The drive module 9 and the drive module 11 here each comprise, not explicitly illustrated in FIG. 1, a drive motor, a housing, a worm gear with a worm shaft and a worm wheel, wherein the worm shaft is mounted in a bearing arrangement.

In general, in an electromechanical power steering system, a drive module can be attached to the steering column 1 or can have a power-assisted drive 31 coupled to the steering shaft 10 at the steering pinion 5. The drive modules 9, 11 can be constructed identically here. An auxiliary torque can be coupled into the steering spindle 3 and/or the steering pinion 5 by the drive module 9, 11 in order to assist the driver in the steering work.

In particular, however, it is provided that the electromechanical power steering system has only a drive module 9 or a drive module 11, in particular at one of the positions shown in FIG. 1.

Figure 2:
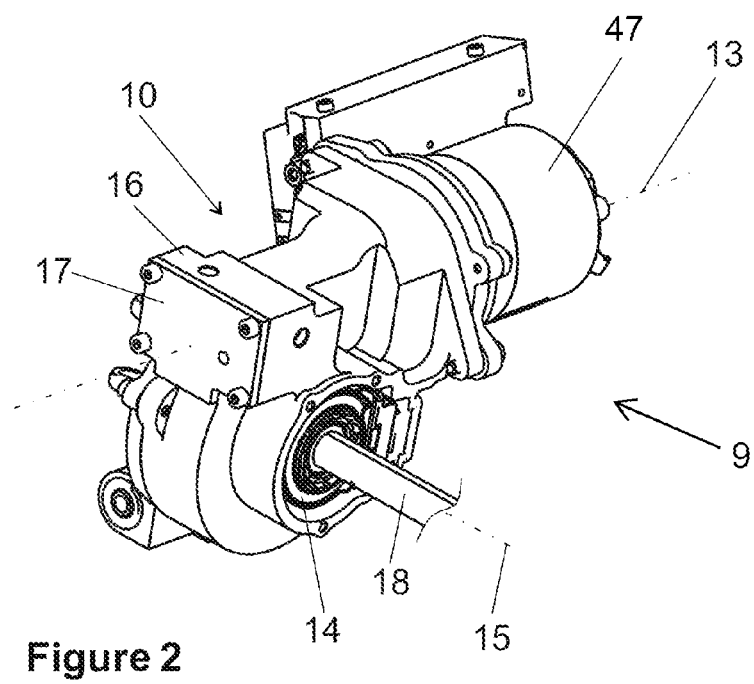
FIG. 2 is a schematic perspective view of an example drive module for an electromechanical power steering system.

An exemplary embodiment of a drive module 9 is explained in more detail here with reference to FIG. 2. The bearing arrangement of the drive module 9 can be configured in particular as explained with reference to the exemplary embodiments according to FIG. 3 to FIG. 6e. The drive module 11 can be correspondingly constructed.

FIG. 2 shows an exemplary embodiment of a drive module 9, 11 for an electromechanical power steering system in a schematic perspective illustration, comprising a worm gear 10 and a drive motor 11.

The worm gear 10 comprises a worm shaft 12, not illustrated in FIG. 2, with a worm shaft axis of rotation 13 and a worm wheel 14 with a worm wheel axis of rotation 15. The worm shaft axis of rotation 13 is the longitudinal axis of the worm shaft 12. The worm shaft 12, also referred to as a worm, is surrounded by a housing element 16 and a housing cover 17 of the worm gear 10 for protection against dirt and foreign bodies. The worm shaft 12 is supported by a bearing arrangement, not illustrated in FIG. 2, wherein the bearing arrangement can be configured in particular as explained with reference to FIG. 4a to FIG. 6e.

The drive motor 11 drives the worm shaft 12 which is mounted rotatably about the worm shaft axis of rotation 13. The worm shaft 12 is in engagement with the worm wheel 14. When the worm shaft 12 rotates, the worm wheel 14 therefore rotates about the worm wheel axis of rotation 15. An output shaft 18 is connected to the worm wheel 14 for conjoint rotation and rotates together with the worm wheel 14 about the worm wheel axis of rotation 15.

Figure 3:
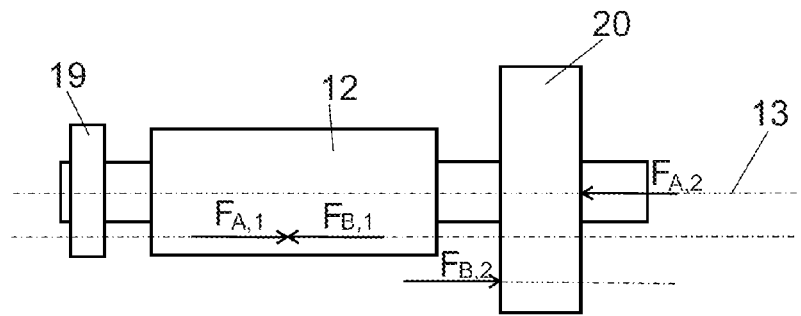
FIG. 3 is a greatly simplified diagram of an abstract exemplary embodiment of a bearing arrangement.

FIG. 3 shows an exemplary embodiment of a bearing arrangement in a greatly simplified diagram.

The bearing arrangement comprises the worm shaft 12 which is mounted rotatably about the worm shaft axis of rotation 13. The worm shaft 12 is supported at its first axial end by a first rotary bearing 19 and at its second axial end by a second rotary bearing 20. The first rotary bearing 19 is configured so as to permit a defined pivoting movement of the worm shaft 12. The second rotary bearing 20 is configured as a pivoting rotary bearing by the second rotary bearing 20 being arranged within a pivoting ring, not illustrated in FIG. 3.

For a better overall view, two separate load cases are jointly illustrated in FIG. 3, namely load case A and load case B. The load cases differ from each other by mutually opposed directions of rotation of the worm shaft 12.

In load case A, a tooth force $F_{A,1}$ acts at the point of the engagement between the worm shaft 12 and the worm wheel 14, not illustrated in FIG. 3, in the direction of the second rotary bearing 20. The tooth force $F_{A,1}$ brings about a bearing reaction force $F_{A,2}$. This results in a reaction torque which pushes or pivots the worm shaft 12 in the direction of the worm wheel 14.

In load case B, a tooth force $F_{B,1}$ acts at the point of the engagement between the worm shaft 12 and the worm wheel 14 in the direction of the first rotary bearing 19. The tooth force $F_{B,1}$ brings about a bearing reaction force $F_{B,2}$. This likewise results in a reaction torque which pushes or pivots the worm shaft 12 in the direction of the worm wheel 14.

Figure 4A:
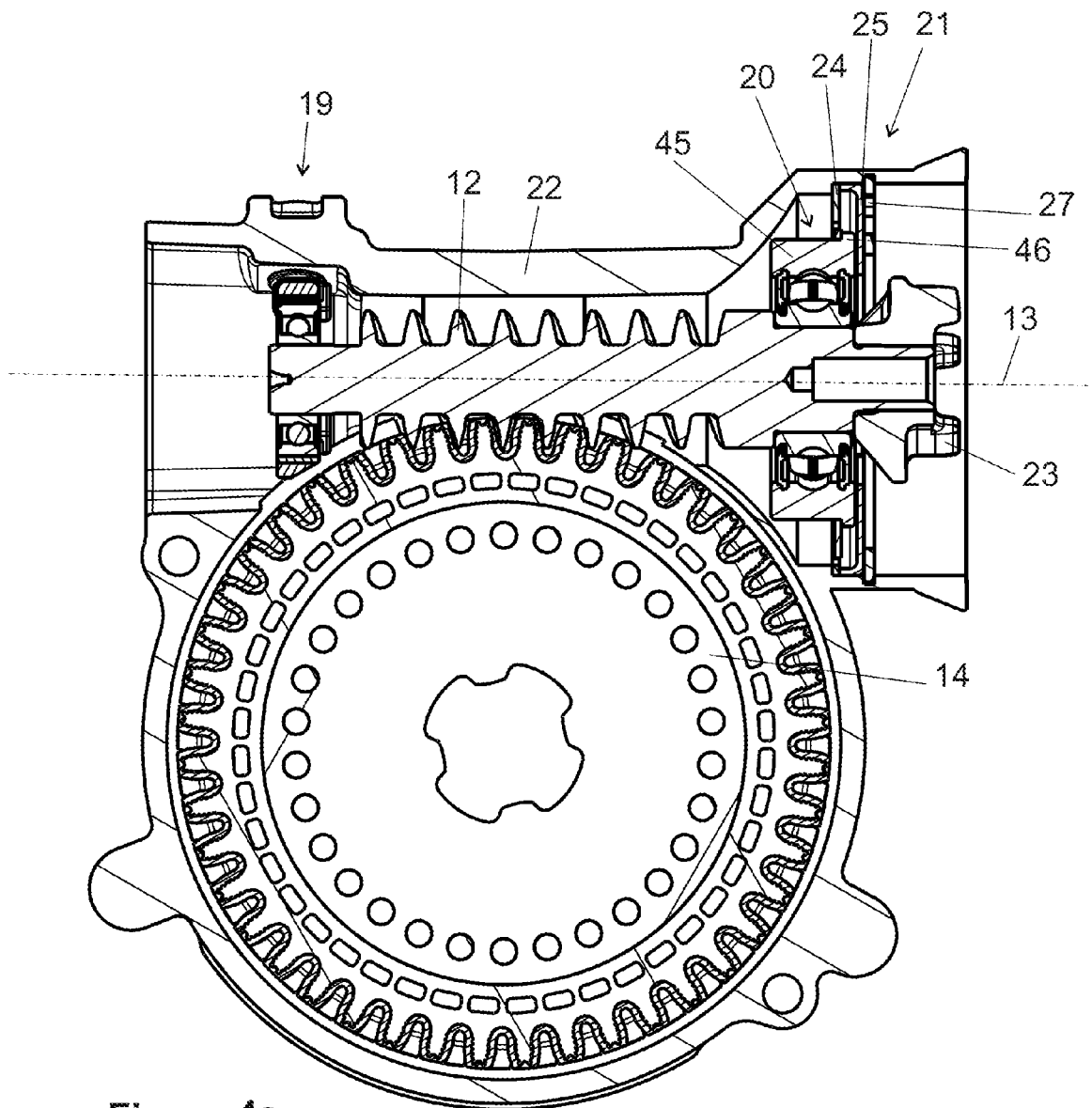
FIG. 4a is a partial sectional view of an example bearing arrangement.

FIG. 4a shows a first embodiment of a bearing arrangement configured according to the invention in a sectional illustration together with a partial section.

The bearing arrangement is configured as a fixed and floating mounting and comprises a first rotary bearing 19 forming the floating bearing, a second rotary bearing 20 forming the fixed bearing, and a pivoting ring 21. The two rotary bearings 19, 20 are each configured as rolling ball bearings. The first rotary bearing 19 is fixed at its outer ring 45 in the direction of the worm shaft axis of rotation 13 and is free from fixings at its inner ring in the direction of the worm shaft axis of rotation 13, and therefore the first rotary bearing 19 cannot absorb any forces acting in the direction of the worm shaft axis of rotation 13, but can exclusively absorb radial forces. The first rotary bearing 19 is configured so as to permit a defined pivoting movement of the worm shaft 12.

The bearing arrangement serves for mounting the worm shaft 12 meshing with the worm wheel 14 in a housing 22 of an electromechanical power steering system. The pivoting ring 21 is configured so as to receive the second rotary bearing 20 in a form-fitting manner. Specifically, the second rotary bearing 20 is held at its outer ring 45 in the direction of the worm shaft axis of rotation 13 by the pivoting ring 21 by a shoulder 46, which is formed integrally in the outer ring 45 of the second rotary bearing 20, being received in a form-fitting manner by the pivoting ring 21. The inner ring of the second rotary bearing 20 is fixed in the direction of the worm shaft axis of rotation 13 by the inner ring being pressed against a shoulder formed in the worm shaft 12 by a securing element 23 which can be screwed onto the end of the worm shaft 12. The second rotary bearing 20 can absorb forces and radial forces acting in the direction of the worm shaft axis of rotation 13.

The pivoting ring 21 comprises a slotted ring 24 as a first pivoting ring component and a sleeve-shaped element 25 as a second pivoting ring component, wherein the sleeve-shaped element 25 has a central recess.

The sleeve-shaped element 25 comprises a disk-shaped portion with a central recess and a wall portion which is connected to the disk-shaped portion at the radially outer edge thereof and extends in the direction of the worm shaft axis of rotation 13. The wall portion is configured as a raised edge. The disk-shaped portion and the wall portion have approximately the same wall thickness.

Figure 4B:
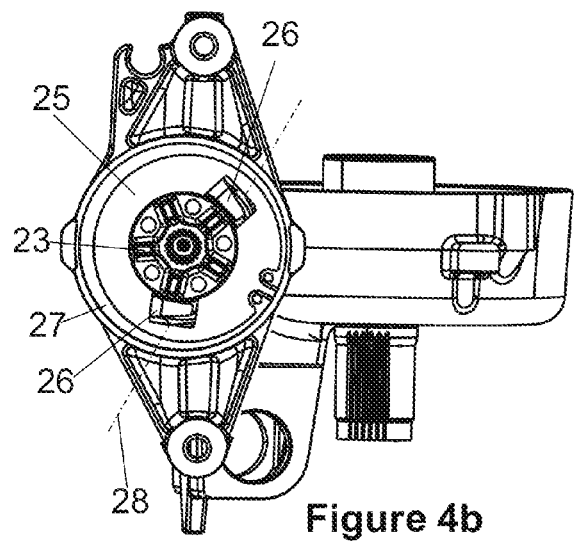

FIG. 4b shows the bearing arrangement from FIG. 4a in a side view.

Tongues 26 are formed in the disk-shaped portion of the sleeve-shaped element 25 as two second points, wherein the tongues 26 each extend in the direction of the worm shaft axis of rotation 13. The slotted ring 24 and the sleeve-shaped element 25 are arranged directly adjacent to each other or lying directly against each other in the direction of the worm shaft axis of rotation 13.

The pivoting ring 21 is configured to act resiliently between the second rotary bearing 20 and the housing 22. For this purpose, the sleeve-shaped element 25 of the pivoting ring 21 is supported on the axial end of the worm shaft 12 facing away from the second rotary bearing 20 at a securing ring 27, which is configured as a snap ring or bore securing ring, in the direction of the worm shaft axis of rotation 13. The securing ring 27 is embedded or fixed in the opening of the housing 22 in a form-fitting manner.

The pivoting ring 21 is configured so as to form a pivot axis. The worm shaft 12 is pivotable about the pivot axis toward the worm wheel 14 by means of the bearing arrangement. The position or spatial position or orientation of the pivot axis is dependent on the direction of rotation of the worm shaft 12, that is to say on the load direction and on the amount of the load torque. The dependency of the position of the pivot axis on the direction of rotation is realized as follows.

In the one load case, that is to say during the one direction of rotation of the worm shaft 12, the second rotary bearing 20 is pushed against the sleeve-shaped element 25 by the geometry of the meshing teeth of the worm shaft 12 and of the worm wheel 14, wherein the sleeve-shaped element 25 has a spring action which corresponds to the geometrical configuration thereof and which in turn brings about a reaction torque which presses or pivots the worm shaft 12 in the direction of the worm wheel 14. This load case corresponds to load case A according to FIG. 3.

In the other load case, that is to say during the other direction of rotation of the worm shaft 12, the second rotary bearing 20 is pushed in the axial direction of the worm shaft 12 against the slotted ring 24 by the geometry of the meshing teeth of the worm shaft 12 and of the worm wheel 14, wherein the slotted ring 24 has a spring action which corresponds to the geometrical configuration thereof and which in turn brings about a reaction torque which pushes or pivots the worm shaft 12 in the direction of the worm wheel 14. This load case corresponds to load case B according to FIG. 3.

The load dependency, that is to say the dependency on the amount of the load torque, of the sleeve-shaped element 25 is implemented by the elasticity or flexibility of the tongues 26. The greater the amount of the load torque, the greater is the elastic deformation of the tongues 26 and the greater is the restoring spring force brought about by the tongues 26.

The pivoting of the worm shaft 12 serves to reduce the gearing play between the worm shaft 12 and the worm wheel 14. The pivot axis runs orthogonally to the radial vector of the worm wheel 14.

The tongues 26 of the sleeve-shaped element 25 are positioned in such a manner that the axis 28 connecting the tongues 26, also referred to as a support point axis or as a second axis, is different from an axis passing through the worm shaft axis of rotation 13, that is to say runs excentrically, i.e. does not run through the center point of the worm wheel 14, i.e. does not run through the worm shaft axis of rotation 13. The tongues 26 are oriented in a mutually opposed manner in the circumferential direction.

The pivoting ring 21 is configured in such a manner that the pivot axis is formed by sprung support points which correspond in particular to the two first points of the first pivoting ring component and to the two second points of the second pivoting ring component. The position of the pivot axis thereby changes depending on the load. The sprung support points are formed by the tongues 26 of the sleeve-shaped element 25. The tongues 26 form a punctiform support contact between the sleeve-shaped element 25 and the second rotary bearing 20. The tongues 26 are elastically deformable and thus have a spring action in the direction of the worm shaft axis of rotation 13. The punctiform support contacts are displaced depending on the forces acting in the direction of the worm shaft axis of rotation 13, that is to say on the axial forces. Each tongue 26 forms a support point. The two tongues 26 therefore form the support point axis 28, i.e. in particular the second axis which is formed by the two second points.

Figure 4C:
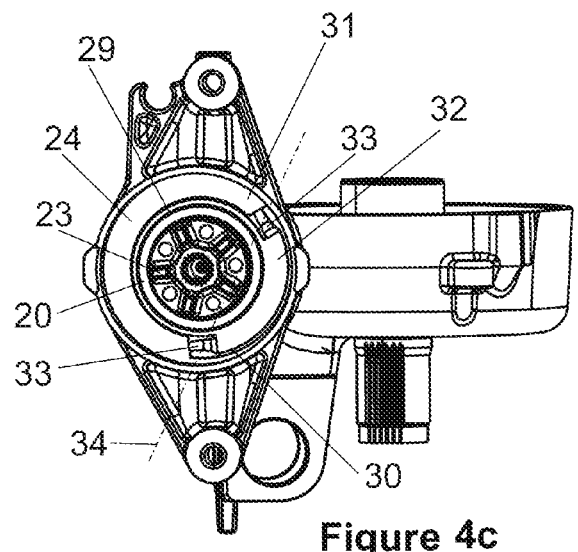

FIG. 4c shows the bearing arrangement from FIG. 4a in a further side view. In comparison to the side view according to FIG. 4b, for the sake of better clarity the securing ring 27 and the sleeve-shaped element 25 are not illustrated, and therefore there is a free view of the slotted ring 24, i.e. the first pivoting ring component.

A first radially inner slot 29 in the shape of an arc of a circle and a second radially outer slot 30 in the shape of an arc of a circle are formed in the slotted ring 24. The first slot 29 and the second slot 30 are partially superimposed in the circumferential direction such that a first partial circular ring 31 and a second partial circular ring 32 are produced. The first partial circular ring 31 and the second partial circular ring 32 are connected by two webs 33. The webs 33 are in particular the two first points of the first pivoting ring component. The two webs 33 each form a material tapering between the first partial circular ring 31 and the second partial circular ring 32 such that the first partial circular ring 31 and the second partial circular ring 32 are pivotable about an axis 34 connecting the two webs 33, also referred to as a tapering point axis 34 or as the first axis. The maximally possible stroke for the sleeve-shaped element 25 is determined by the distance to the shoulder 46 and, for the slotted ring 24, by the distance between the support in the housing 22 and the second partial circular ring 32 of the ring 24.

The load dependency of the slotted ring 24 is realized by the elasticity or flexibility of the webs 33 and thus in particular by the two first points of the first pivoting ring component. The greater the amount of the load torque, the greater is the elastic deformation of the webs 33 and the greater is the restoring spring force brought about by the webs 33.

The profile or the spatial position or the orientation of the pivot axis is dependent on the respective profiles or spatial positions or orientations of the support point axis 28 and of the tapering point axis 34, and thus in particular on the second axis formed by the two second points of the second pivoting ring component and the first axis formed by the two first points of the first pivoting ring component.

In the case without load, that is to say when the worm shaft 12 is not rotating, the pivot axis of the pivoting ring 21 runs parallel to the support point axis 28 and to the tapering point axis 34 and also centrally between the support point axis 28 and the tapering point axis 34.

In the case with load, that is to say when the worm shaft 12 is rotating, the pivot axis of the pivoting ring 21 likewise runs parallel to the support point axis 28 and to the tapering point axis 34. However, the pivot axis then does not run centrally between the second axis 28 and the first axis 34, but rather runs closer to the support point axis 28 formed by the two tongues 26, i.e. the second axis 28, or closer to the tapering point axis 34 formed by the two webs 33, i.e. the first axis 34, depending on the direction of rotation of the worm shaft 12 and on the amount of the load torque that is to be overcome. Specifically, the pivot axis runs closer to the support point axis 28, that is to say further away from the tapering point axis 34, when the tooth forces are directed towards the sleeve-shaped element 25. This corresponds to load case A according to FIG. 3. By contrast, the pivot axis runs closer to the tapering point axis 34, that is to say further away from the support point axis 28, when the tooth forces are directed towards the slotted ring 24. This corresponds to load case B according to FIG. 3.

Figure 4D:
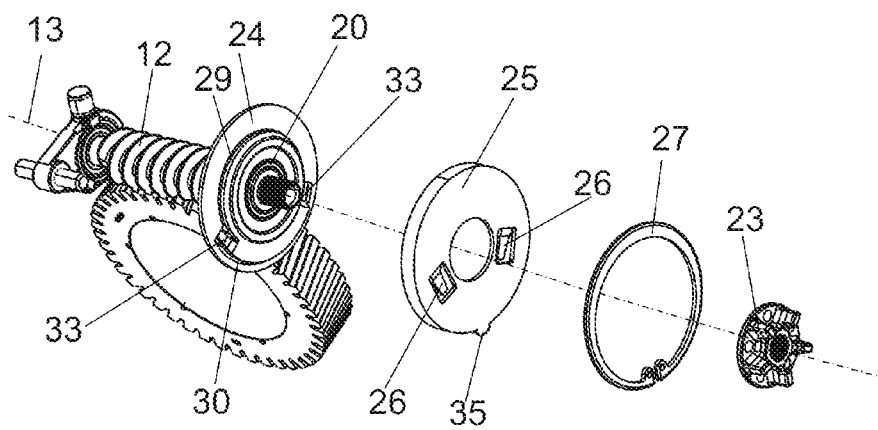

FIG. 4d shows the bearing arrangement from FIG. 4a in an illustration exploded along the worm shaft axis of rotation 13.

The sleeve-shaped element 25 comprises anti-twist protection 35. The anti-twist protection 35 ensures that the sleeve-shaped element 25 does not twist relative to the other structural elements over the course of the operating period. This ensures that the pivot axis maintains its designated spatial position. The anti-twist protection 35 is configured as a molding extending in the radial direction. The anti-twist protection 35 is formed integrally with the sleeve-shaped element 25. Alternatively, the anti-twist protection 35 can also be configured as a separate component which is connectable to the sleeve-shaped element 25.

FIG. 5a shows a second embodiment of a bearing arrangement configured according to the invention in a sectional illustration. This second embodiment is basically constructed analogously to the first embodiment according to FIGS. 4a-d. To avoid repetitions, parts and structural elements corresponding to the first embodiment are therefore considered to be correspondingly described at this juncture.

FIG. 5b shows the bearing arrangement from FIG. 5a in a side view.

The tongues 26, i.e. in particular the two second points, of the sleeve-shaped element 25, i.e. in particular of the second pivoting ring component, are positioned in such a manner that the support point axis 28 connecting the two tongues 26, i.e. in particular the second axis 28 formed by the two second points, is an axis passing through the worm shaft axis of rotation 13, that is to say runs centrally, i.e. runs through the center point of the worm wheel 14, i.e. runs through the worm shaft axis of rotation 13.

FIG. 5c shows the bearing arrangement from FIG. 5a in a further side view. In comparison to the side view according to FIG. 5b, for the sake of better clarity the securing ring 27 and the sleeve-shaped element 25 are not illustrated, and therefore there is a free view of the slotted ring 24, i.e. in particular the first pivoting ring component.

Two webs 33, i.e. in particular two first points of the first pivoting ring component, are formed in the slotted ring 24, analogously to the slotted ring of the first embodiment. The two webs 33 each form a material tapering between the first partial circular ring 31 and the second partial circular ring 32 such that the first partial circular ring 31 and the second partial circular ring 32 are pivotable about the tapering point axis 34 connecting the webs 33, i.e. in particular about the first axis 34 formed by the two first points.

Owing to the fact that the support point axis 28 formed by the two tongues 26, i.e. in particular the second axis 28, runs centrally and that the pivot axis of the pivoting ring 21 is dependent on the support point axis 28, i.e. in particular on the second axis 28, and on the tapering point axis 34, i.e. in particular the first axis 34, the pivot axis of the pivoting ring 21 of the second embodiment runs differently from the pivot axis of the pivoting ring 21 of the first embodiment according to FIGS. 4a-d.

Figure 5D:
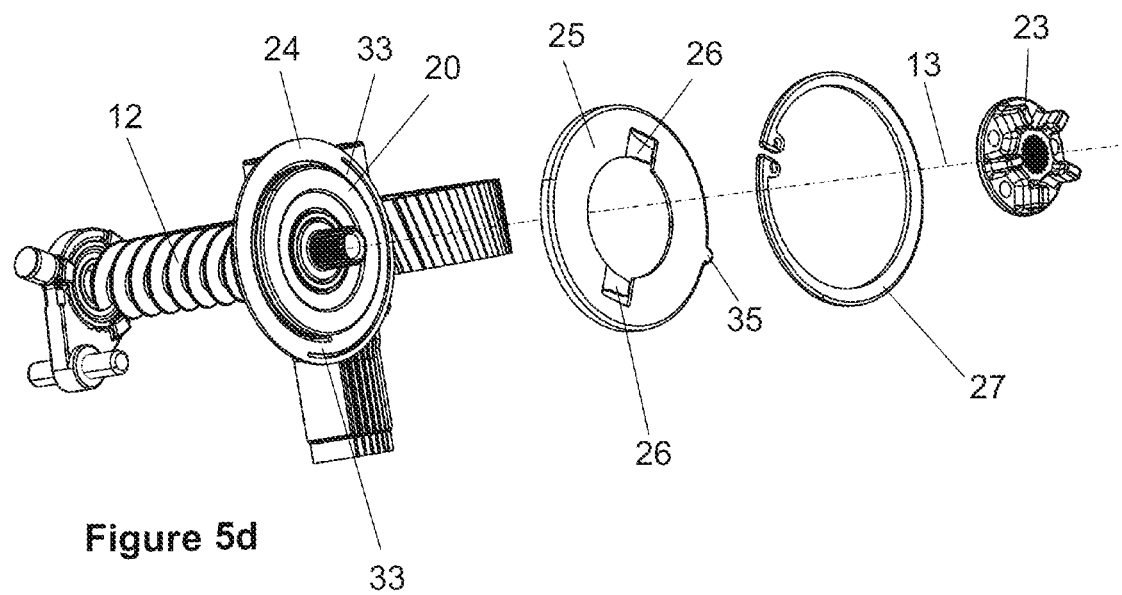

FIG. 5d shows the bearing arrangement from FIG. 5a in an illustration exploded along the worm shaft axis of rotation 13.

Figure 6A:
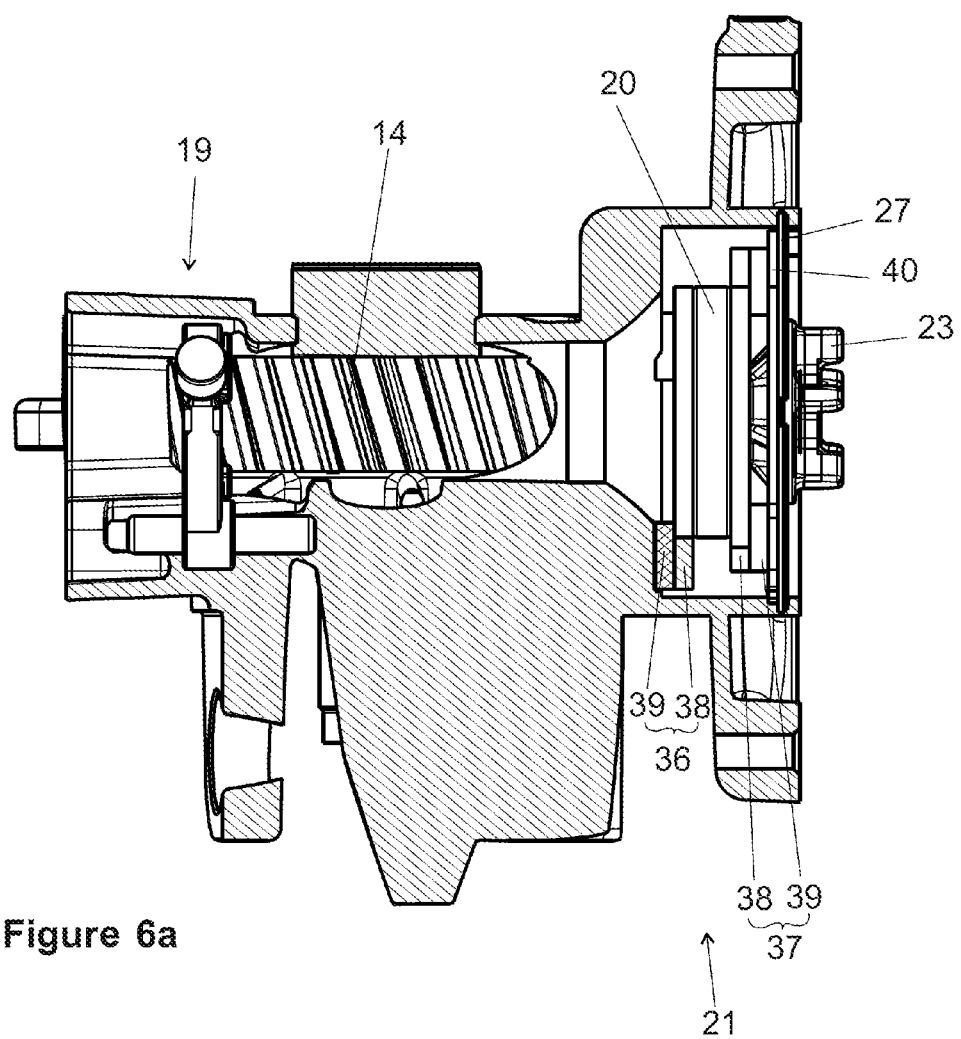
FIG. 6a is a partial sectional view of yet another example bearing arrangement.

FIG. 6a shows a third embodiment of the bearing arrangement according to the invention in a sectional illustration together with a partial section. For the sake of better clarity, the worm shaft 13 is not illustrated.

The third embodiment of the bearing arrangement according to the invention is basically constructed similarly to the first and second embodiment according to FIGS. 4a-d and 5a-d. To avoid repetitions, parts and structural elements corresponding to the first and second embodiment are therefore considered to be correspondingly described at this juncture.

In contrast to the first two embodiments, the pivoting ring 21 according to the third embodiment comprises a first receiving unit 36 with a central recess as the first pivoting ring component and a second receiving unit 37 with a central recess as the second pivoting ring component. The first receiving unit 36 and the second receiving unit 37 each comprise an annular element 38 and a spring unit 39 for the spring mounting acting in the axial direction, that is to say in the direction of the worm shaft axis of rotation 13. The spring units 39 each comprise two separate elastomer cushions. The elastomer cushions here in particular in each case form the two first points of the first pivoting ring component and the two second points of the second pivoting ring component.

The second rotary bearing 20 is connected to the first receiving unit 36 and to the second receiving unit 37 by the outer ring of the second rotary bearing 20 at both axial ends in each case having a step bounded by an axially central shoulder for the axial stop. The two steps are configured to receive the first receiving unit 36 and the second receiving unit 37.

The pivoting ring 21 furthermore comprises a supporting element 40 with a central recess, wherein the supporting element 40 is configured so as to receive the spring unit 39 of the second receiving unit 37.

Figure 6B:
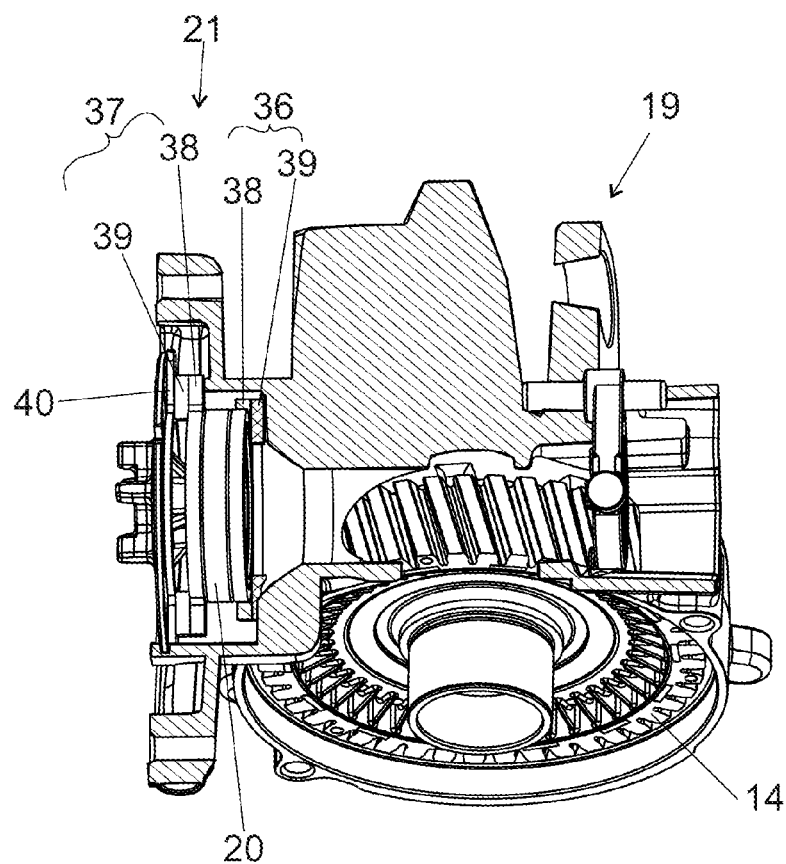

FIG. 6b shows the bearing arrangement from FIG. 6a in a sectioned perspective illustration with a partial section, wherein, for better clarity, the worm shaft 13 is not illustrated.

Figure 6C:
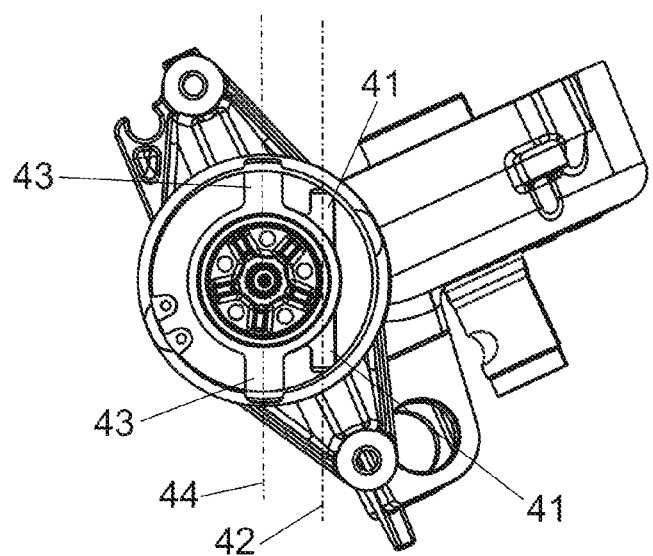

FIG. 6c shows the bearing arrangement from FIG. 6a in a side view.

The annular element 38 of the first receiving unit 36 has moldings 41 running in the tangential direction for receiving the associated spring unit 39. The moldings 41 of the annular element 38 of the first receiving unit 36 form a first molding point axis 42 which corresponds in particular to the first axis 42 formed by the two first points of the first pivoting ring component.

The annular element 38 of the second receiving unit 37 has moldings 43 running in the radial direction for receiving the associated spring unit. The moldings 43 of the annular element 38 of the second receiving unit 37 form a second molding point axis 44 which corresponds in particular to the second axis 44 formed by the two second points of the second pivoting ring component.

The profile or the spatial position or the orientation of the pivot axis of the pivoting ring 21 is dependent on the respective profiles or spatial positions or orientations of the first molding point axis 42 and of the second molding point axis 44, i.e. in particular on the first axis 42 formed by the two first points of the first pivoting ring component and on the second axis 44 formed by the two second points of the second pivoting ring component.

In the case without load, that is to say when the worm shaft 12 is not rotating, the pivot axis runs parallel to and centrally between the first axis 42 and the second axis 44, i.e. in particular between the molding point axes 42, 44.

In the case with load, that is to say when the worm shaft 12 is rotating, the pivot axis of the pivoting ring 21 likewise runs parallel to the first and second molding point axis 42, 44. However, the pivot axis then does not run centrally between the two axes 42, 44, but rather runs closer to the second molding point axis 44 formed by the second receiving unit 37 or closer to the first molding point axis 42 formed by the first receiving unit 36 depending on the direction of rotation of the worm shaft 12 and on the amount of the load torque that is to be overcome. Specifically, the pivot axis runs closer to the second molding point axis 44, that is to say further away from the first molding point axis 42, when the tooth forces are directed toward the second receiving unit 37. This corresponds to load case A according to FIG. 3. By contrast, the pivot axis runs closer to the first molding point axis 42, that is to say further away from the second molding point axis 44, when the tooth forces are directed toward the first receiving unit 37. This corresponds to load case B according to FIG. 3. The exact profile of the pivot axis is dependent on the geometrical configuration of the respective spring units 39 and on the properties of the material used for the respective spring units 39.

Figure 6D:
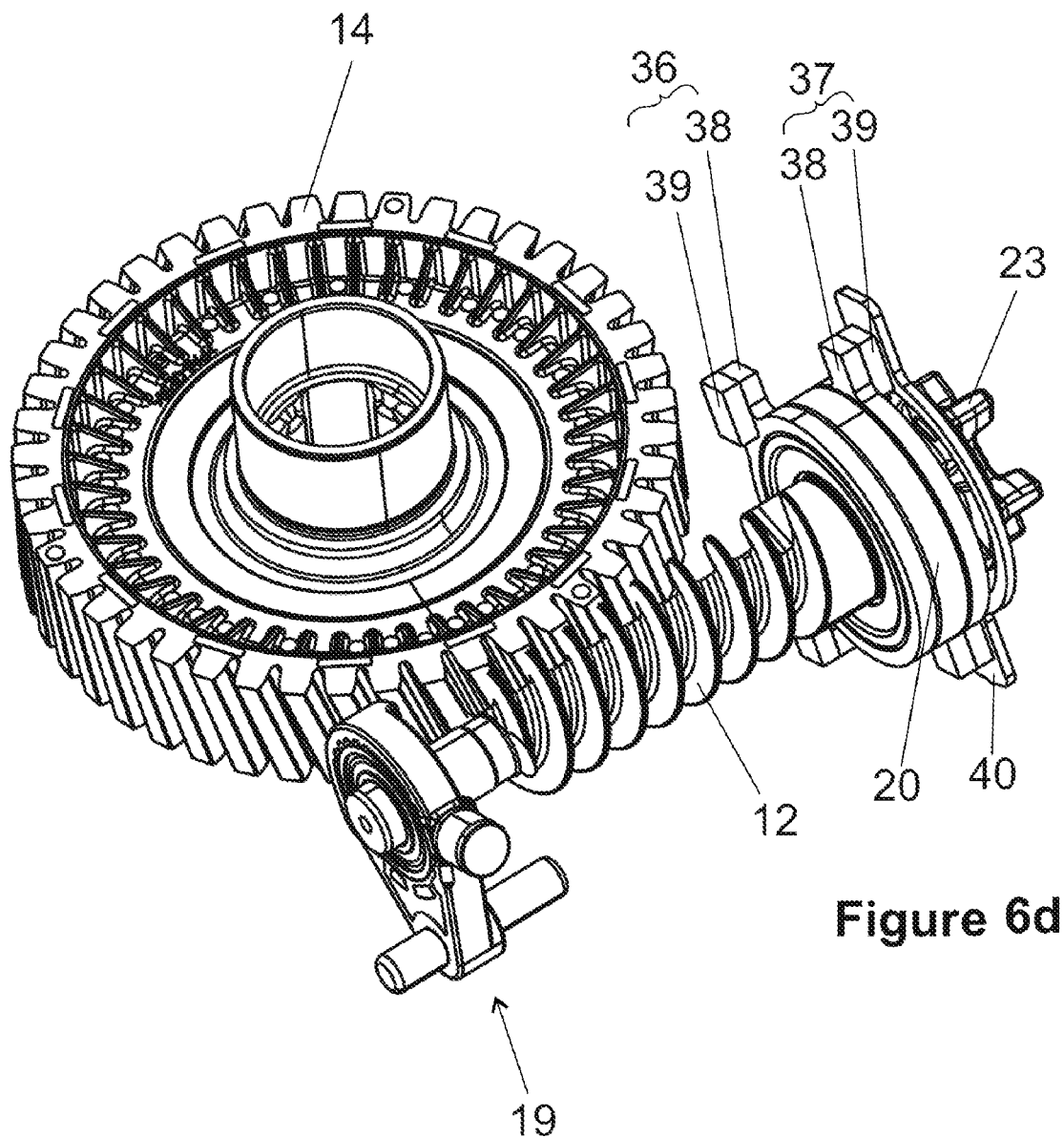
FIG. 6d is a perspective view of the example bearing arrangement of FIG. 6a without the housing.

FIG. 6d shows the bearing arrangement from FIG. 6a in a perspective illustration without the housing.

Figure 6E:
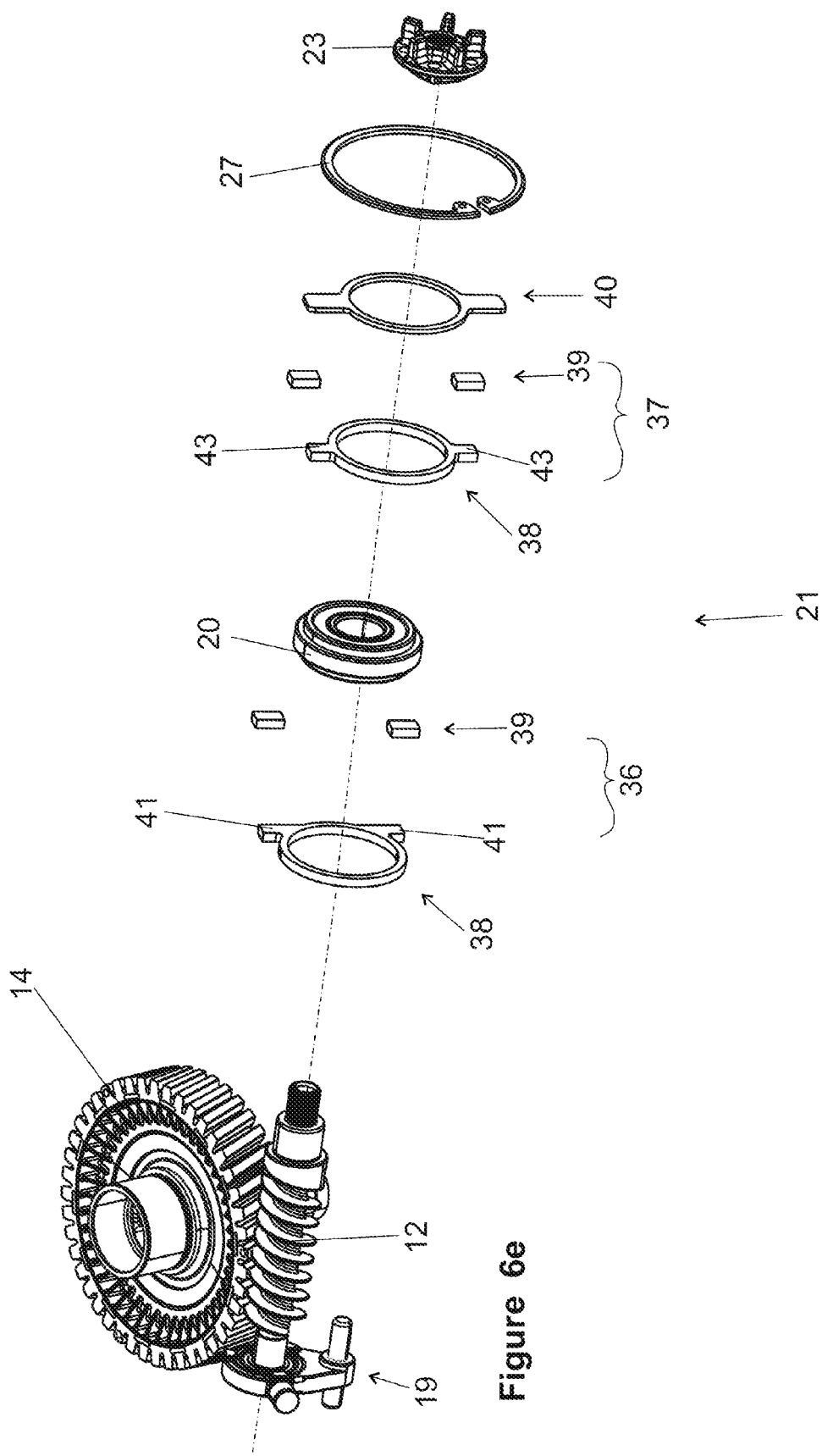

FIG. 6e shows the bearing arrangement from FIG. 6a in an illustration exploded along the worm shaft axis of rotation 13.

LIST OF REFERENCE SIGNS

1 Steering column
2 Steering gear
3 Steering spindle

4 Steering wheel
5 Steering pinion
6 Steering rack
7 Steering tie rod
8 Vehicle wheel
9 Drive module
10 Worm gear
11 Drive module
12 Worm shaft
13 Worm shaft axis of rotation
14 Worm wheel
15 Worm wheel axis of rotation
16 Housing element
17 Housing cover
18 Output shaft
19 First rotary bearing
20 Second rotary bearing
21 Pivoting ring
22 Housing
23 Securing element
24 Slotted ring
25 Sleeve-shaped element
26 Tongue
27 Securing ring
28 Support point axis (second axis)
29 First slot
30 Second slot
31 First partial circular ring
32 Second partial circular ring
33 Web
34 Tapering point axis (first axis)
35 Anti-twist protection
36 First receiving unit
37 Second receiving unit
38 Annular element
39 Spring unit
40 Supporting element
41 Molding
42 First molding point axis (first axis)
43 Molding
44 Second molding point axis (second axis)
45 Outer ring
46 Shoulder
47 Electric motor
$F_{A,1}$ Tooth force
$F_{A,2}$ Bearing reaction force
$F_{B,1}$ Tooth force
$F_{B,2}$ Bearing reaction force

What is claimed is:

1. A bearing arrangement for mounting a worm shaft meshing with a worm wheel in a housing of an electromechanical power steering system, the bearing arrangement comprising:
    a first rotary bearing configured to permit a pivoting movement of the worm shaft;
    a pivoting ring that includes a first pivoting ring component and a second pivoting ring component and is configured to act resiliently between a second rotary bearing and the housing; and
    the second rotary bearing at least partially disposed in the pivoting ring between the first pivoting ring component and the second pivoting ring component,
    wherein the first pivoting ring component includes two first points with respect to which the first pivoting ring component is configured resiliently,
    wherein the second pivoting ring component includes two second points with respect to which the second pivoting ring component is configured resiliently;
    wherein the second rotary bearing includes an outer ring that forms a shoulder and the pivoting ring holds the shoulder in a form-fitting manner.

2. The bearing arrangement of claim 1 wherein the two first points form a first axis and the two second points form a second axis, wherein the first axis and the second axis are not congruent.

3. The bearing arrangement of claim 1 wherein the two first points and the two second points are in each case sprung supporting points.

4. The bearing arrangement of claim 1 wherein the pivoting ring is configured to form a pivot axis.

5. The bearing arrangement of claim 4 wherein the pivoting ring is configured such that the pivot axis extends orthogonally to a radial vector of the worm wheel.

6. The bearing arrangement of claim 4 wherein the pivoting ring is configured such that the pivot axis is formed by the two first points and the two second points.

7. The bearing arrangement of claim 4 wherein the pivoting ring via the two first points and the two second points changes a position of the pivot axis based on a direction of rotation of the worm shaft.

8. The bearing arrangement of claim 4 wherein the pivoting ring via the two first points and the two second points changes a position of the pivot axis based on an amount of load torque to be overcome.

9. The bearing arrangement of claim 1 wherein at least one of the first pivoting ring component or the second pivoting ring component is disposed on the shoulder.

10. The bearing arrangement of claim 9 wherein the shoulder serves as a mechanical stop for at least one of the first pivoting ring component or the second pivoting ring component.

11. An electromechanical power steering system with a drive module that comprises a drive motor, a housing, a worm gear, and a bearing arrangement, wherein the worm gear comprises a worm shaft with a worm shaft axis of rotation and a worm wheel with a worm wheel axis of rotation, wherein the worm shaft is mounted in the bearing arrangement of claim 1.

12. A bearing arrangement for mounting a worm shaft meshing with a worm wheel in a housing of an electromechanical power steering system, the bearing arrangement comprising:
    a first rotary bearing configured to permit a pivoting movement of the worm shaft;
    a pivoting ring that includes a first pivoting ring component and a second pivoting ring component and is configured to act resiliently between a second rotary bearing and the housing; and
    the second rotary bearing at least partially disposed in the pivoting ring between the first pivoting ring component and the second pivoting ring component,
    wherein the first pivoting ring component includes two first points with respect to which the first pivoting ring component is configured resiliently,
    wherein the second pivoting ring component includes two second points with respect to which the second pivoting ring component is configured resiliently;
    wherein the pivoting ring comprises a slotted ring as the first pivoting ring component and a sleeve-shaped element as the second pivoting ring component.

13. The bearing arrangement of claim 12 wherein a first radially inner slot in a shape of an arc of a circle and a second radially outer slot in a shape of an arc of a circle are formed in the slotted ring, wherein the first radially inner slot and the second radially outer slot are partially superimposed in a circumferential direction to produce a first partial circular ring and a second partial circular ring, wherein the first partial circular ring and the second partial circular ring are connected by two webs as the two first points.

14. The bearing arrangement of claim 12 wherein the sleeve-shaped element comprises a disk-shaped portion with a central recess and a wall portion that is connected to the disk-shaped portion at a radially outer edge thereof and extends in an axial direction of the worm shaft, wherein tongues are formed in the disk-shaped portion as the two second points, wherein the tongues each extend in the axial direction of the worm shaft.

15. The bearing arrangement of claim 14 wherein the tongues are positioned such that an axis connecting the tongues passes through a longitudinal axis of the worm shaft.

16. The bearing arrangement of claim 14 wherein the tongues oppose one another in a circumferential direction.

17. A bearing arrangement for mounting a worm shaft meshing with a worm wheel in a housing of an electromechanical power steering system, the bearing arrangement comprising:
 a first rotary bearing configured to permit a pivoting movement of the worm shaft;
 a pivoting ring that includes a first pivoting ring component and a second pivoting ring component and is configured to act resiliently a a second rotary bearing and the housing; and
 the second rotary bearing at least partially disposed in the pivoting ring between the first pivoting ring component and the second pivoting ring component,
 wherein the first pivoting ring component includes two first points with respect to which the first pivoting component is configured resiliently,
 wherein the second pivoting ring component includes two second points with respect to which the second pivoting ring component is configured resiliently;
 wherein the pivoting ring comprises a first receiving unit with a central recess as the first pivoting ring component and a second receiving unit with a central recess as the second pivoting ring component, and the first receiving unit and the second receiving unit each comprise an annular element and a spring unit for spring mounting acting in an axial direction, wherein the spring unit in each case forms the two first points and the two second points.

18. The bearing arrangement of claim 17 wherein the pivoting ring comprises a supporting element with a central recess, wherein the supporting element is configured to receive the spring unit of one of the receiving units.

19. The bearing arrangement of claim 18 wherein at least one of the first pivoting ring component, the second pivoting ring component, or the supporting element has anti-twist protection.

20. The bearing arrangement of claim 17 wherein the annular element of the first receiving unit has moldings running in a tangential direction for receiving the respective spring unit.

21. The bearing arrangement of claim 20 wherein the annular element of the second receiving unit has moldings running in a radial direction for receiving the respective spring unit.

22. The bearing arrangement of claim 17 wherein each spring unit comprises an elastomer cushion.

* * * * *